(12) United States Patent
Ridyard et al.

(10) Patent No.: US 6,271,355 B1
(45) Date of Patent: Aug. 7, 2001

(54) AMINE PYRAZOLE NICKEL PHTHALOCYANINE DYES FOR COLORATION

(75) Inventors: Denis Robert Annesley Ridyard, Stockport; Andrew Hunter Morris Renfrew, Bury, both of (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 08/107,146

(22) Filed: Aug. 17, 1993

Related U.S. Application Data

(63) Continuation of application No. 07/739,107, filed on Aug. 1, 1991, now abandoned.

(30) Foreign Application Priority Data

Aug. 15, 1990 (GB) .................................................. 9017863

(51) Int. Cl.[7] ......................... C09B 62/095; C09B 44/04; C09B 29/36; C09B 44/08

(52) U.S. Cl. ........................ 534/617; 534/619; 534/638; 534/603; 534/613; 534/626

(58) Field of Search ..................... 534/617, 619, 534/638, 603, 613, 620

(56) References Cited

U.S. PATENT DOCUMENTS

| | | | |
|---|---|---|---|
| 3,082,201 | * | 3/1963 | Koller .................................. 534/628 |
| 3,123,594 | * | 3/1964 | Koller et al. ...................... 534/628 X |
| 3,362,949 | * | 1/1968 | Benz et al. ........................ 534/636 X |
| 3,697,500 | * | 10/1972 | Ackermann et al. ................. 534/636 |
| 3,988,310 | * | 10/1976 | Gerlach et al. .................. 534/636 X |
| 4,515,598 | | 5/1985 | Meininger et al. ....................... 8/549 |

FOREIGN PATENT DOCUMENTS

| | | | |
|---|---|---|---|
| 659820 | | 2/1984 | (CH) . |
| 0947779 | * | 1/1964 | (GB) .................................... 534/628 |
| 1003786 | | 9/1965 | (GB) . |
| 1035006 | * | 7/1966 | (GB) .................................... 534/628 |

\* cited by examiner

*Primary Examiner*—Floyd D. Higel
(74) *Attorney, Agent, or Firm*—Pillsbury Winthrop LLP

(57) ABSTRACT

Dyes of Formula (1) which are useful for the coloration of e.g. cellulosic materials and leathers.

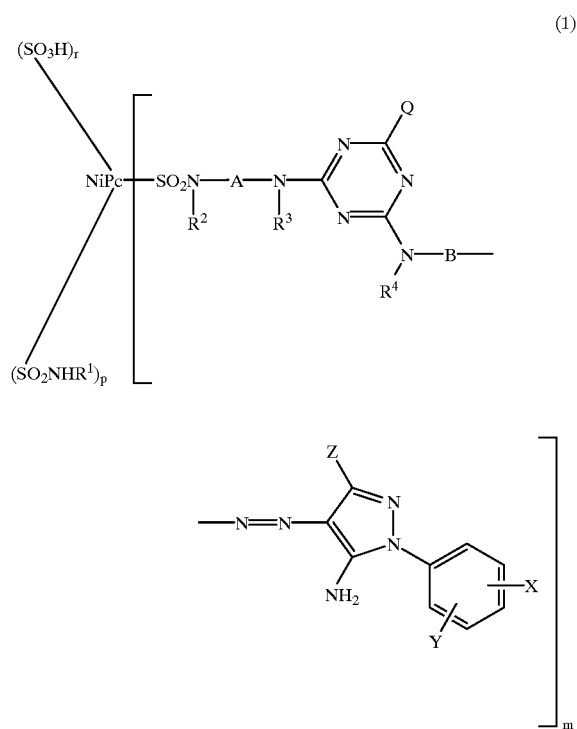

wherein:
NiPc is a nickel phthalocyanine radical;
r has a value from 1 to 3 inclusive;
m has a value from 1 to 3 inclusive;
p has a value from 0 to 1 inclusive;
$R^1$ is H, alkyl, substituted alkyl, aryl or substituted aryl;
$R^2$, $R^3$ and $R^4$ are each independently H, $C_{1-6}$-alkyl or substituted $C_{1-6}$-alkyl;
A is phenylene, substituted phenylene, $C_{1-6}$-alkylene or substituted $C_{1-6}$-alkylene;
Q is a labile substituent;
B is phenylene, phenylene substituted by 1 or 2 sulpho groups or phenylene substituted by an alkyl or alkoxy group;
Z is H or alkyl; and
X and Y are each independently H, alkyl, alkoxy, halogen, carboxy or sulpho;
provided that r+m+p does not exceed 4.

8 Claims, No Drawings

AMINE PYRAZOLE NICKEL PHTHALOCYANINE DYES FOR COLORATION

This is a continuation application Ser. No. 07/739,107, filed on Aug. 1. 1991 now ABN.

This invention relates to a dye suitable for use in the coloration of materials having a hydroxy or —NH— group, to a process for its manufacture, to a process for the coloration of materials with the dye and to materials so colored.

According to the present invention there is provided a dye which, in the free acid form, is of Formula (1):

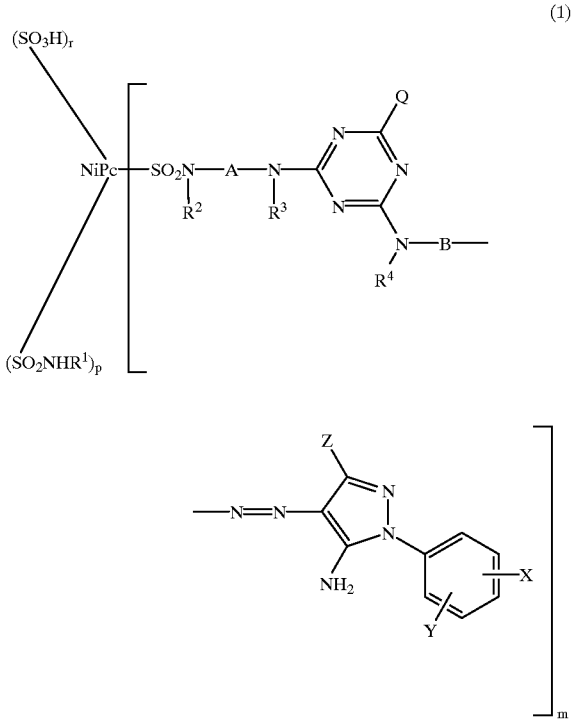

wherein:
  NiPc is a nickel phthalocyanine radical;
  r has a value from 1 to 3 inclusive;
  m has a value from 1 to 3 inclusive;
  p has a value from 0 to 1 inclusive;
  $R^1$ is H, alkyl, substituted alkyl, aryl or substituted aryl;
  $R^2$, $R^3$ and $R^4$ are each independently H, $C_{1-6}$-alkyl or substituted $C_{1-6}$-alkyl;
  A is phenylene, substituted phenylene, $C_{1-6}$-alkylene or substituted $C_{1-6}$-alkylene;
  Q is a labile substituent;
  B is phenylene, phenylene substituted by 1 or 2 sulpho groups, or phenylene substituted by an alkyl or alkoxy group;
  Z is H or alkyl; and
  X and Y are each independently H, alkyl, alkoxy, halogen, carboxy or sulpho;
provided that r+m+p does not exceed 4.

It is preferred that the substituents shown in brackets in Formula (1) are bonded to the 3-positions of the phenyl rings in the phthalocyanine nucleus.

When any of A, $R^1$, $R^2$, $R^3$ and $R^4$ are substituted it is preferred that the substituents are independently selected from $CH_3$, $OCH_3$, halo, $NO_2CN$, $NHCOCH_3$, $NH_2$ and especially hydroxy, sulpho and carboxy.

$R^1$, $R^2$, $R^3$ and $R^4$ are preferably independently H or $C_{1-4}$-alkyl, especially H.

When the group represented by A is $C_{1-6}$-alkylene it is preferably $C_{1-3}$-alkylene such as —$CH_2CH_2$13 or —$CH_2CH_2CH_2$—. However, it is preferred that A is phenylene or substituted phenylene, more preferably phenylene, especially 1,3-phenylene.

A labile substituent is one capable of being displaced by nucleophilic substitution during exhaust dyeing to form a covalent bond between the triazinyl ring in Formula (1) and the nucleophile. The labile substituent Q is preferably halo such as F or Br, and more especially Cl. However, Q can also be a quaternary ammonium group such as tri-($C_{1-4}$) alkyl ammonium, e.g. $(CH_3)_3N^+$— or a pyridinium group such as one derived from a pyridine carboxylic acid e.g. from nicotinic acid or isonicotinic acid.

B is preferably phenylene or phenylene substituted by 1 or 2 sulpho groups or by a group selected from $C_{1-4}$-alkyl, especially methyl and $C_{1-4}$-alkoxy, especially methoxy. It is more preferable that B is phenylene or phenylene substituted by 1 or 2 sulpho groups, especially by 2 —$SO_3H$ groups. As examples of groups represented by B there may be mentioned 4-sulpho-1,3-phenylene and 4,6-disulpho-1,3-phenylene.

Z is preferably H or $C_{1-4}$-alkyl, especially methyl.

It is preferred that X and Y are each independently selected from the group H, $C_{1-4}$-alkyl, carboxy, $C_{1-4}$-alkoxy, halogen and sulpho, more preferably H, methyl, methoxy, Cl, Br and sulpho.

For convenience of manufacture it is preferred that the sum of r+m+p is 4. p preferably has a value of 0. In a particularly preferred class of dyes p has a value of 0, and r+m is 4 and the ratio of r:m is in the range 1:3 to 3:1, especially approximately 1:2 to 2:1.

In a preferred aspect of the present invention the dye comprises a composition containing two or more of the structures of Formula (1) as hereinbefore defined, especially structures which differ only in the respective values of r, m and p; such compositions are of value in the coloration of cellulosic materials and leathers.

The present invention also provides a process (wherein $R^1$, $R^2$, $R^3$, $R^4$, NiPc, p, r, m, A, B, X, Y, Z are as defined above and Q is halo) for the manufacture of dyes of Formula (1) which comprises coupling a compound of formula $NiPc(SO_2Cl)_{p+r+m}$ with a diamine of formula $HN(R^2)$—A—$N(R^3)(R^5)$ (wherein $R^5$ is either H or a protecting group, especially a protecting group which is removable by hydrolysis, for example $CH_3CO$—) to give compound of Formula (2):

which is treated with aqueous base to convert ($SO_2Cl$) to ($SO_3H$) and remove the protecting group $R^5$ when present to give a compound of Formula (3):

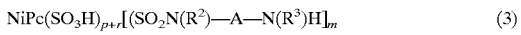

A compound of formula $HN(R^4)$—B—$NH_2$ is reacted with a cyanuric halide, preferably below 10° C., to give a mono-adduct which is subsequently diazotised using a diazotising agent, e.g. $NaNO_2$, at below 5° C. to give a diazo suspension of Formula (4) which is coupled, preferably in the presence of phosphate buffer, with a compound of Formula (5) to give a dichlorotriazinyl azo yellow component of Formula (6).

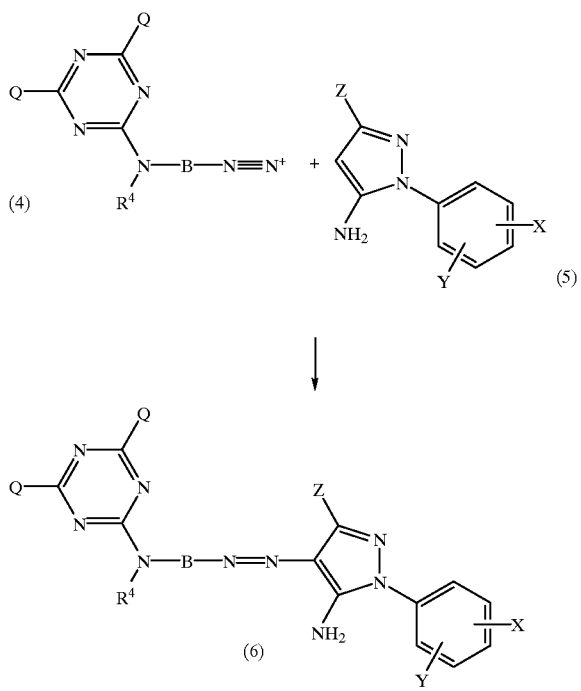

The dyes of Formula (1) wherein p has a value of 0 are prepared by condensing compounds of Formulae (3) and (6), preferably at a pH of between 6.5 and 7.

Dyes of Formula (1) wherein Q is quaternary ammonium can be prepared by making the corresponding compound in which Q is Cl, which is preferably prepared by the above process, then reacting with the appropriate amine to make the corresponding quaternary ammonium salt.

Dyes of Formula (1) wherein p is greater than 0 can be prepared by using the above process except that the compound of Formula (2) is reacted with an amine of formula $R^1NH_2$ before said treatment with aqueous base.

It is to be understood that the present invention relates not only to dyes of Formula (1) but also to salts thereof, particularly the salt with an alkali metal, ammonia or a water-soluble amine especially the sodium, lithium, potassium or mixed sodium/lithium salt.

The term "dye" when used in this specification as a noun does not limit the invention to compounds which are intended for use as a dye, although in a preferred embodiment the compounds of the invention are in fact intended for use as dyes.

The dye of the invention is characterised by its good dyeing properties, and in particular its good build up on cotton, its attractive green shade and excellent fastness to wet treatments and to light. The surprisingly high solubility of a dye according to the invention in salt solutions is of great value in exhaust dyeing where such solutions are used. The dye is also valuable for colouring leather on which it is found to have good build up properties, good penetration and excellent fastness to wet treatments and to light.

According to a further aspect of the present invention there is provided a process for the coloration of a material, particularly a material having a hydroxy or —NH— group, such as a cellulosic material (e.g. cotton, jute, hemp or flax), animal hairs, an animal skin or a leather, comprising applying thereto a dye of Formula (1). It is preferred that the coloration of cellulosic materials is performed under alkaline conditions, for example in the presence of an acid binding agent. For the coloration of animal hairs, skins and leather coloration is preferably performed under weakly acid conditions. A still further aspect of the invention provides materials, such as those described above, when colored by the coloration process or with a dye of Formula (1).

The invention is further illustrated by the following Examples in which all parts and percentages are by weight unless otherwise indicated.

EXAMPLE 1

28.8 Parts of nickel phthalocyanine were added to 131 parts of chlorosulphonic acid with stirring, at such a rate that the temperature did not rise above 60° C. The mixture was then heated to 135° C. and stirred at 135–140° C. for 3 hours and allowed to cool to ambient temperature. The reaction mass was then added to a large excess of ice/water at such a rate that the temperature did not exceed 2° C. The product was collected by filtration and washed with three lots of 70 parts of ice cold water. The filter cake was charged to 500 parts of ice cold water and the pH adjusted to 7 with 2N sodium carbonate solution whilst maintaining the temperature at less than 5° C. 18.7 Parts of monoacetyl-m-phenylene diamine hydrochloride were added and the mixture stirred for 2 hours at pH 6.5–7 at a temperature of less than 5° C. The mixture was then allowed to warm up to ambient temperature at pH 6.5–7. The volume was adjusted to 1200 ml with water and sodium hydroxide pellets (48 parts) were added. The mixture was then heated to 70–80° C. and stirred at 70–80 ° C. for a further 2 hours before cooling and adjusting the pH to 7 with concentrated hydrochloric acid (S.G. 1.18). Sodium chloride (10% w/v) was added and the pH adjusted to 2 with further concentrated hydrochloric acid. The product was collected by filtration, washed with 2N hydrochloric acid until excess m-phenylene diamine could not be detected (Ehrlich's reagent) and dried to give a nickel phthalocyanine base.

42.4 Parts of m-phenylene diamine disulphonic acid were dissolved in 300 parts of water at pH 5, 0.5 part of calsolene oil added and the solution cooled to a temperature of below 5° C. A solution of 20.4 parts of cyanuric chloride in acetone was added and the mixture was stirred for 2 hours at pH 4–5 at a temperature of less than 5° C. The solution was screened, acidified with 20 parts of concentrated hydrochloric acid (S.G. 1.18) and 52 parts of 2N sodium nitrite solution were added with stirring over 15 minutes at a temperature less than 5° C. The mixture was stirred for a further 1½ hours at 0–5° C. and excess nitrous acid was then destroyed by the addition of 10% aqueous sulphamic acid to give a diazo suspension.

A solution of 19 parts of 1-phenyl-3-methyl-5-aminopyrazole in acetone was added to the above diazo suspension at 0–5° C. and the pH raised to 7. The mixture was stirred at 0–5° C. and pH 6.5–7 for a further 1½ hours. 10 Parts of mixed phosphate buffer (2 parts of potassium dihydrogen phosphate and 1 part of disodium hydrogen phosphate) and sodium chloride (10% w/v) were added. After stirring for 30 minutes the product was collected by filtration and washed with acetone. The moist filter cake was mixed with 10 parts of mixed phosphate buffer and dried to give a dichlorotriazinylazo yellow component.

11.3 Parts of the nickel phthalocyanine base prepared above were dissolved in 400 parts of water at ambient temperature at pH 7 and 24.5 parts of the dichlorotriazinylazo yellow component added. The suspension was stirred for 30 minutes at ambient temperature whilst maintaining the pH between 6.5 and 7. The temperature was then raised slowly to 40° C. to complete the condensation and sodium chloride (15% w/v) added. After stirring for a further 30 minutes the product was collected by filtration, reslurried in acetone, filtered off and the filter cake washed with acetone until the filtrates were colourless and dried to give the dye of Formula (7) wherein r and m are respectively approximately 2.7 and 1.3.

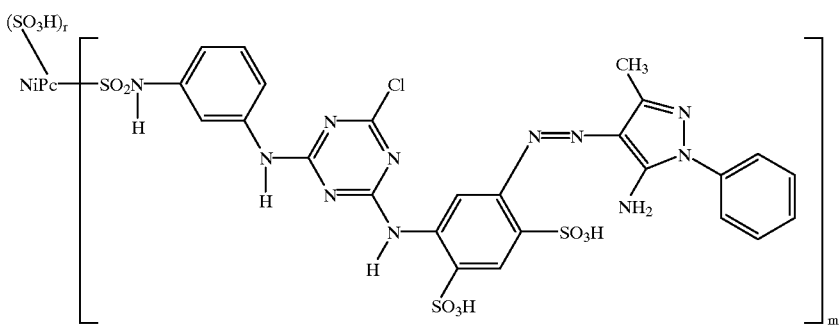

(7)

When the dye was applied to cellulose fibres in conjunction with an acid binding agent, the fibres were dyed in strong bright yellowish-green shades having good build up and fastness to wet treatments and to light.

EXAMPLE 2

The dye prepared in Example 1 was applied to leather under slightly acidic conditions (pH approximately 4.5) and dyed the leather a bright green shade with excellent fastness to wet treatments and to light.

EXAMPLE 3

28.8 Parts of nickel phthalocyanine were added to 166 parts of chlorosulphonic acid with stirring at such a rate that the temperature did not rise above 60° C. The mixture was then heated to 135° C., stirred at 135–140° C. for 3 hours and allowed to cool to ambient temperature. The reaction mass was then added to a large excess of ice/water at such a rate that the temperature did not exceed 2° C. The product was collected by filtration and washed with ice cold water. The filter cake was charged to 500 parts of ice cold water and the pH adjusted to 7 with 2N sodium carbonate solution whilst maintaining the temperature at less than 5° C. 34.5 Parts of monoacetyl-m-phenylene diamine hydrochloride were added and the mixture stirred for 2 hours at pH 6.5–7 at a temperature of less than 5° C. The mixture was then allowed to warm to ambient temperature at pH 6.5–7. The volume was adjusted to 1500 ml with water and sodium hydroxide pellets (60 parts) were added. The mixture was then heated to 70–80° C. and stirred at 70–80° C. for a further 2 hours before cooling and adjusting the pH to 7 with concentrated hydrochloric acid (S.G. 1.18). Sodium chloride (10% w/v) and potassium chloride (10% w/v) were added and the pH adjusted to 6 with further concentrated hydrochloric acid. The product was collected by filtration, washed with 2N hydrochloric acid until excess m-phenylene diamine could not be detected (Ehrlich's reagent) and dried to give a nickel phthalocyanine base.

11.3 Parts of the nickel phthalocyanine base and 41 parts of the dichlorotriazinyl yellow component prepared as in Example 1 were condensed together using similar conditions to those described in Example 1 to give the dye of Formula (7) wherein r and m are respectively approximately 1.5 and 2.5.

When this dye was applied to cellulose fibres in conjunction with an acid binding agent, the fibres were dyed in strong bright yellowish-green shades having good build up and fastness to wet treatments and to light.

EXAMPLE 4

The dye of Formula (7) wherein r and m each have a value of approximately 2 may be prepared by mixing 0.9 parts of the dye prepared in Example 1 with 1.1 parts of the dye prepared in Example 3.

EXAMPLES 5 to 15

Further dyes of the invention can be prepared in an analogous manner to Example 3 by condensing nickel phthalocyanine sulphonyl chloride prepared as in Example 3 with an excess of the monoacetyldiamine or approximately a nine fold excess of the diamine listed in column 1, followed by hydrolytic removal of the acetyl group where present to give a nickel phthalocyanine base. A dichlorotriazinyl yellow component is prepared by condensing cyanuric chloride with the diamine listed in column 2, diazotising the resulting dichlorotriazinyl compound and coupling with the aminopyrazole coupling component listed in column 3. The nickel phthalocyanine base and dichlorotriazinyl yellow component are then condensed at a pH of between 6.5 and 7.

| Example | 1 | 2 | 3 |
|---|---|---|---|
| 5 | monoacetyl-p-phenylenediamine | m-phenylenediamine disulphonic acid | 1-phenyl-3-methyl-5-aminopyrazole |
| 6 | ethylene diamine | m-phenylenediamine disulphonic acid | 1-phenyl-3-methyl-5-aminopyrazole |
| 7 | propylene diamine | m-phenylenediamine disulphonic acid | 1-phenyl-3-methyl-5-aminopyrazole |
| 8 | beta-hydroxyethyl ethylene diamine | m-phenylenediamine disulphonic acid | 1-phenyl-3-methyl-5-aminopyrazole |
| 9 | monoacetyl-m-phenylene diamine | m-phenylenediamine sulphonic acid | 1-phenyl-3-methyl-5-aminopyrazole |
| 10 | monoacetyl-m-phenylene diamine | m-phenylenediamine disulphonic acid | 1-(4'-sulphophenyl) 3-methyl-5-amino pyrazole |
| 11 | monoacetyl-m-phenylene diamine | m-phenylenediamine sulphonic acid | 1-(2'-methyl 5-sulphophenyl)-3-methyl-5-amino pyrazole |
| 12 | monoacetyl-m-phenylene diamine | m-phenylenediamine sulphonic acid | 1-(2-chlorophenyl) 3-methyl-5-amino pyrazole |
| 13 | monoacetyl-m-phenylene diamine | m-phenylenediamine sulphonic acid | 1-phenyl-5-amino pyrazole |
| 14 | ethylene diamine | m-phenylenediamine | 1-phenyl-3-methyl- |

-continued

| Example | 1 | 2 | 3 |
|---|---|---|---|
| 15 | beta-hydroxy ethylene diamine | sulphonic acid m-phenylenediamine sulphonic acid | 5-amino pyrazole 1-phenyl-3-methyl-5-amino pyrazole |

What is claimed is:

1. A dye which, in the free acid form, is of the Formula:

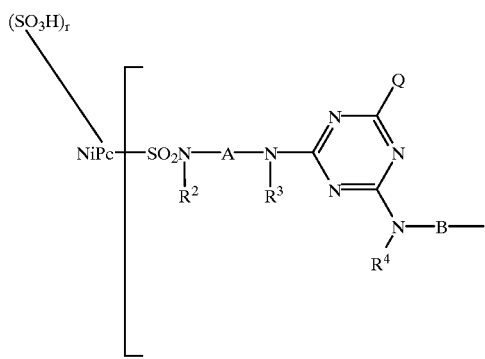

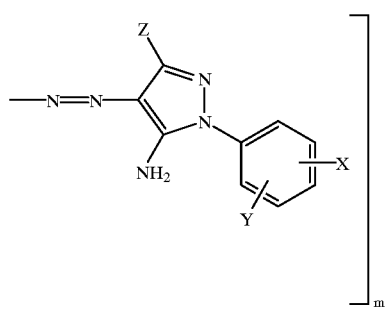

wherein:

NiPc is a nickel phthalocyanine radical;

r has a value from 1 to 3 inclusive;

m has a value from 1 to 3 inclusive;

p has a value from 0 to 1 inclusive;

$R_2$, $R_3$ and $R^4$ are each independently H, $C_{1-6}$-alkyl or $C_{1-6}$-alkyl substituted by $CH_3$, $OCH_3$, halo, $NO_2$, CN, $NHCOCH_3$, $NH_2$, hydroxy, sulpho or carboxy;

A is phenylene, substituted phenylene, $C_{1-6}$-alkylene or substituted $C_{1-6}$-alkylene, wherein the substituent is selected from $CH_3$, $OCH_3$, halo, $NO_2$, CN, $NHCOCH_3$, $NH_2$, hydroxy, sulpho and carboxy;

Q is halo, tri-($C_{1-4}$)alkylammonium or a pyridinium group;

B is phenylene, phenylene substituted by 1 or 2 sulpho groups or phenylene substituted by an alkyl or alkoxy group;

Z is H or alkyl; and

X and Y are each independently H, alkyl, alkoxy, halogen, carboxy or sulpho;

provided that r+m does not exceed 4.

2. A dye according to claim 1 wherein Q is Cl.

3. A dye according to claim 1 wherein A is phenylene or phenylene substituted by $CH_3$, $OCH_3$, halo, $NO_2$, CN, $NHCOCH_3$, $NH_2$, hydroxy, sulpho or carboxy.

4. A dye according to claim 1 wherein B is phenylene or phenylene substituted by 1 or 2 sulpho groups.

5. A dye according to claim 1 wherein Z is H or $C_{1-4}$-alkyl.

6. A dye according to claim 1 wherein $R^2$, $R^3$ and $R^4$ are independently H or $C_{1-4}$-alkyl.

7. A dye which, in the free acid form, is the formula:

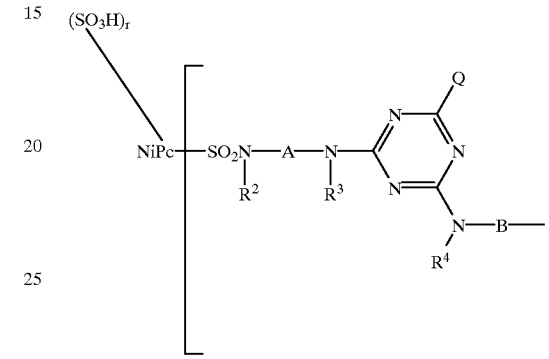

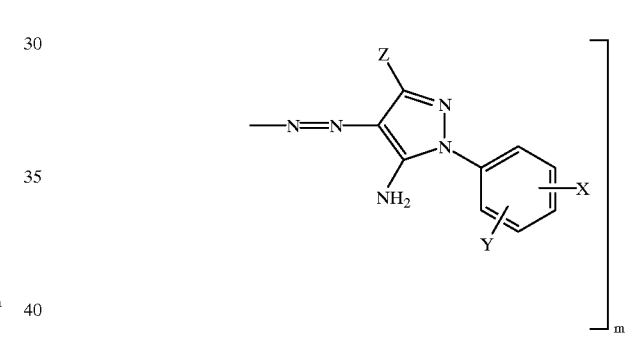

wherein:

NiPc is a nickel phthalocyanine radical;

r has a value from 1 to 3 inclusive;

m has a value from 1 to 3 inclusive;

$R^2$, $R^3$ and $R^4$ are each independently H, $C_{1-6}$-alkyl or $C_{1-6}$-alkyl substituted by a $CH_3$, $OCH_3$, halo, $NO_2$, CN, $NHCOCH_3$, $NH_2$, hydroxy, sulpho or carboxy group;

A is phenylene or phenylene substituted by a $CH_3$, $OCH_3$, halo, $NO_2$, CN, $NHCOCH_3$, $NH_2$, hydroxy, sulpho or carboxy group;

Q is a Cl or a pyridinium group;

B is phenylene or phenylene substituted by 1 or 2 sulpho groups;

Z is H or $C_{1-4}$-alkyl; and

X and Y are each independently H, $C_{1-4}$-alkyl, carboxy, $C_{1-4}$-alkoxy, halogen or sulpho;

provided that r+m does not exceed 4.

8. A dye according to claim 7 wherein Q is Cl.

* * * * *